United States Patent

Assarpour

(10) Patent No.: US 10,084,613 B2
(45) Date of Patent: Sep. 25, 2018

(54) SELF ADAPTING DRIVER FOR CONTROLLING DATAPATH HARDWARE ELEMENTS

(71) Applicant: Extreme Networks, Inc., San Jose, CA (US)

(72) Inventor: Hamid Assarpour, Arlington, MA (US)

(73) Assignee: Extreme Networks, Inc., San Jose, CA (US)

(*) Notice: Subject to any disclaimer, the term of this patent is extended or adjusted under 35 U.S.C. 154(b) by 1159 days.

(21) Appl. No.: 13/628,358

(22) Filed: Sep. 27, 2012

(65) Prior Publication Data

US 2014/0086241 A1 Mar. 27, 2014

(51) Int. Cl.
*H04L 12/46* (2006.01)

(52) U.S. Cl.
CPC ................................ *H04L 12/4641* (2013.01)

(58) Field of Classification Search
CPC ...... H04L 45/00; H04L 45/56; H04L 47/2441
USPC ........................................................ 370/389
See application file for complete search history.

(56) References Cited

U.S. PATENT DOCUMENTS

| 6,460,043 | B1* | 10/2002 | Tabbara et al. |
| 2007/0143572 | A1* | 6/2007 | Lee et al. ....................... 711/207 |
| 2011/0145210 | A1* | 6/2011 | Rathinam et al. ............ 707/705 |
| 2012/0120964 | A1* | 5/2012 | Koponen et al. ............. 370/409 |
| 2013/0044751 | A1* | 2/2013 | Casado et al. ................ 370/392 |
| 2013/0117428 | A1* | 5/2013 | Koponen et al. ............. 709/223 |

* cited by examiner

*Primary Examiner* — Marsha D. Banks Harold
*Assistant Examiner* — Elton Williams
(74) *Attorney, Agent, or Firm* — Haley Guiliano LLP

(57) ABSTRACT

A self adapting driver for controlling datapath hardware elements uses a generic driver and a configuration library to create a set of data structures and methods to map information provided by applications to physical tables. A set of virtual tables is implemented as an interface between the applications and the generic driver. The generic driver uses the configuration library to determine a mapping from the virtual tables to the physical tables. A virtual table schema definition is parsed to create the configuration library, such that changes to the physical infrastructure may be implemented as changes to the virtual table schema definition without adjusting the driver code. Thus automatically generated creation of generic packet forwarding drivers is able to be implemented through the use of a configuration language that defines the meaning of the information stored in the virtual tables.

16 Claims, 3 Drawing Sheets

Legend:
10: Network
12: Network Element
14: Link

SELF ADAPTING DRIVER FOR CONTROLLING DATAPATH HARDWARE ELEMENTS

CROSS-REFERENCE TO RELATED APPLICATIONS

This application is related to U.S. Patent Application entitled *Method For Abstracting Datapath Hardware Elements* filed on even date herewith, the content of which is hereby incorporated herein by reference.

BACKGROUND

Field

This application relates to network elements and, more particularly, to a self adapting driver for controlling datapath hardware elements.

Description of the Related Art

Data communication networks may include various switches, nodes, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

Network elements are designed to handle packets of data efficiently, to minimize the amount of delay associated with transmission of the data on the network. Conventionally, this is implemented by using hardware in a data plane of the network element to forward packets of data, while using software in a control plane of the network element to configure the network element to cooperate with other network elements on the network.

The applications running in the control plane make decisions about how particular types of traffic should be handled by the network element to allow packets of data to be properly forwarded on the network. For example, a network element may include a routing process, which runs in the control plane, that enables the network element to have a synchronized view of the network topology. Forwarding state, computed using this network topology is then programmed into the data plane to enable the network element to forward packets of data across the network. Multiple processes may be running in the control plane to enable the network element to interact with other network elements on the network and forward data packets on the network.

As the control applications make decisions, the control plane programs the hardware in the dataplane to enable the dataplane to be adjusted to properly handle traffic. The data plane includes Application Specific Integrated Circuits (ASICs), Field-Programmable Gate Arrays (FPGAs), and other hardware elements designed to receive packets of data, perform lookup operations on specified fields of packet headers, and make forwarding decisions as to how the packet should be transmitted on the network. Lookup operations are typically implemented using tables and registers containing entries populated by the control plane.

Drivers are used to abstract the data plane hardware elements from the control plane applications and provide a set of functions which the applications may use to program the hardware implementing the dataplane. Example driver instructions exposed by the driver Application Program Interface (API) may include "add route", "delete route", and hundreds of other instructions which enable the applications to instruct the driver to adjust the hardware to cause the network element to exhibit desired behavior on the network.

The driver takes the instructions received from the applications and implements the instructions by setting values in data registers and physical tables that are used by the hardware to control operation of the hardware. Since the driver code is specifically created to translate instructions from the applications to updates to the hardware, any changes to the hardware requires that the driver code be updated. For example, adding functionality to the hardware will require the driver to be updated to enable applications to access the new functionality. Similarly, changing the hardware elements, e.g. by changing the format of how the data is stored in the dataplane, requires the driver to be updated. Implementing changes to the driver code increases development cost, since any time the driver is changed it needs to be debugged to check for problems. This not only costs money, but also increases the amount of time required to bring the newly configured product to market.

SUMMARY OF THE DISCLOSURE

The following Summary, and the Abstract set forth at the end of this application, are provided herein to introduce some concepts discussed in the Detailed Description below. The Summary and Abstract sections are not comprehensive and are not intended to delineate the scope of protectable subject matter which is set forth by the claims presented below.

A self adapting driver for controlling datapath hardware elements uses a generic driver and a configuration library to create a set of data structures and methods to map information provided by applications to physical tables. A set of virtual tables is implemented as an interface between the applications and the generic driver. The generic driver uses the configuration library to determine a mapping from the virtual tables to the physical tables. When changes are implemented in the physical infrastructure, rather than change the driver, the configuration library is instead changed which enables new data structures and methods to be automatically created for use by the generic driver to accommodate the new mapping structure. The configuration library specifies a set of data structures and utility method functions that are used by the generic driver to access the data structures provided by the configuration library. In one embodiment, the generic driver includes a mapping function implemented as code that maps virtual tables to physical tables. The mapping function uses the provided utility method functions to access the configuration library in order to automatically adapt its behavior to perform the mapping between the virtual tables and physical tables specified by the virtual table schema definition.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
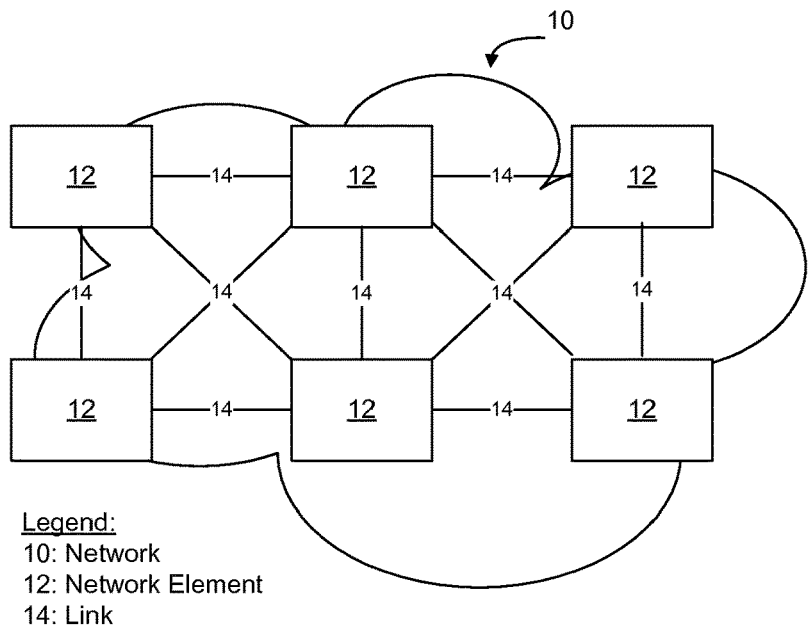
FIG. 1 is a functional block diagram of an example network.

FIG. 1 illustrates an example network 10 in which a plurality of network elements 12 such as switches and routers are interconnected by links 14 which enable the network elements to exchange packets of data. As network elements 12 receive packets they make forwarding decisions to enable the packets of data to be forwarded on the network toward their intended destinations.

Figure 2:
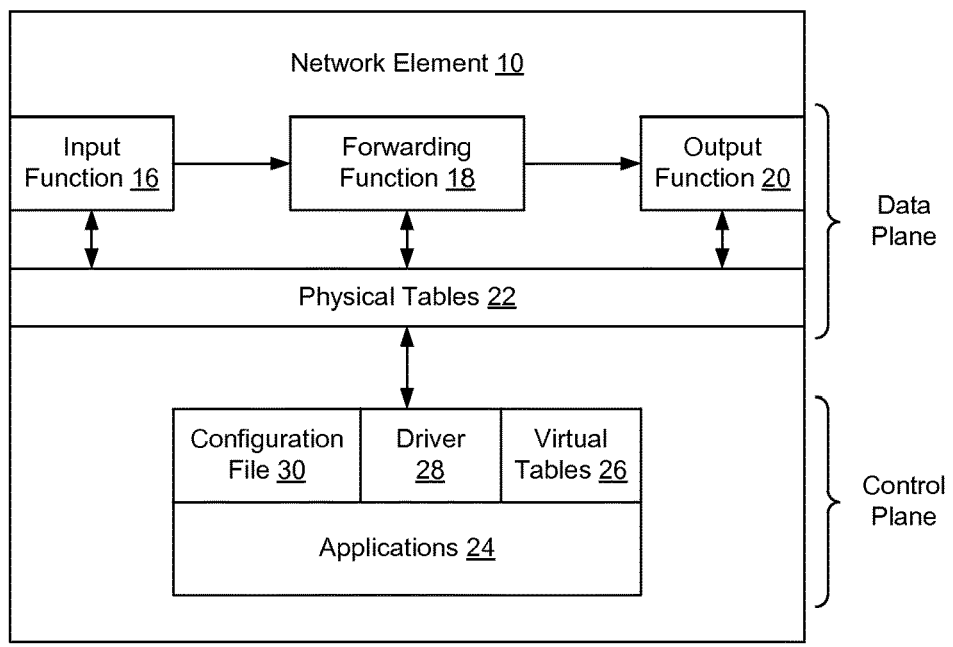
FIG. 2 is a functional block diagram of an example network element.

FIG. 2 is a functional block diagram of an example network element. As shown in FIG. 2, in its simplest form, a network element includes an input function 16 to receive packets of data from a communication network, a forwarding function 18 to make forwarding decisions, and an output function 20 to forward the packet onward onto the communication network. The input function, forwarding function, and output function are implemented by dataplane hardware elements which have access to physical tables 22. The data contained in physical tables 22 controls operation of the dataplane hardware elements to enable the dataplane to handle packet forwarding as specified by the control plane.

The network element also includes a control plane having a set of applications 24 running on a processor (not shown). The applications set data into virtual tables 26 which is mapped by driver 28 to the physical tables 22 for use by the dataplane hardware elements. The manner in which the driver 28 maps data between the virtual tables and physical tables is specified by configuration file 30.

Figure 3:
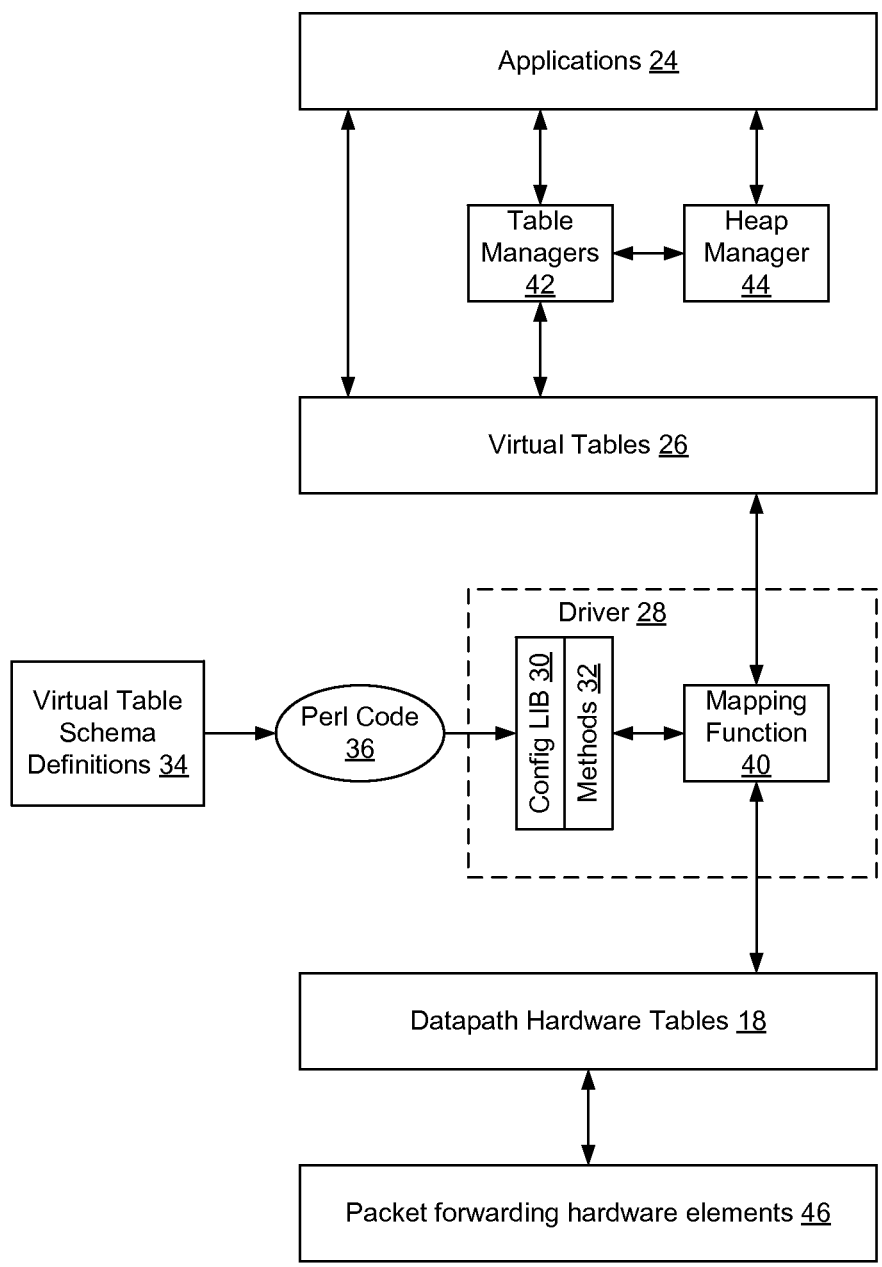
FIG. 3 is a functional block diagram of a portion of the network element of FIG. 2 in greater detail.

FIG. 3 is a functional block diagram of a portion of the network element of FIG. 2 in greater detail. As shown in FIG. 3, applications 24 pass data to virtual tables 26 which provides an abstraction layer between the applications 24 and driver 28. By implementing a table based abstraction layer as an interface intermediate the applications and the hardware driver 28, the applications 24 are able to cause data to be inserted into datapath hardware tables 18 by writing and reading data to/from the virtual tables as described in greater detail in U.S. patent application Ser. No. 13/628,152, filed Sep. 27, 2012, entitled "Method for Abstracting Datapath Hardware Elements", the content of which is hereby incorporated herein by reference.

In one embodiment, the API used by applications to interact with virtual tables 26 has a small set of commands, which enable SET, GET, and EVENT actions to be implemented on the virtual tables. Set commands are used by applications to write data to the virtual tables; Get commands are used by applications to read data from the virtual tables; and Event commands are used to notify the applications of occurrences. Further, the applications are able to use a Get Index command to obtain a memory allocation from the heap manager 44 and are able to use a Free Index command to release memory in the heap manager to allow the applications to request and release memory allocated to storing data in virtual tables. Instead of utilizing a complicated action-based API, in which the applications output instructions associated with actions to be taken, as is conventional, the applications are thus able to interact with the table based abstraction layer using a very small set of commands. Since the interaction between the applications and table based abstraction layer is not based on functional instructions, the same small API set may be used to implement multiple functions. Further, changes to the functionality of the underlying hardware elements does not require changes to the API to enable the applications to access the new functionality. Hence, adding functionality to the hardware does not require changes at the application level. For example, instead of having an action based API "set route" and another action based API "set VPN" the application may implement both of these functions simply using a SET command to cause the new route data and the new VPN data to be inserted into the correct fields of the virtual tables.

The virtual tables may be presented to the applications as virtual index tables and virtual search tables. A virtual index table represents an abstraction of one or more physical tables. It includes one or more records where each record is associated with a unique Index. An index, is a zero-based unsigned integer that is uniquely associated with a record in a virtual index table.

A record is a virtual table unit of access. Each record is associated with a unique index and is a container for one or more attributes. The index may either come from the application or the application may request one from the heap manager using a get index instruction. Attributes are data structures that have the following properties: (1) identifier; (2) mask; and (3) value. An attribute may belong to one or more virtual tables and may be an index to another table, a key or a data field. The attribute ID uniquely identifies an attribute across all virtual tables.

A virtual search table has one or more records. Each record is associated with a unique index or search index. The record contains one or more attributes. A set of attributes have a key type and are referred to as key attributes. Adding a record to a virtual search table involves mapping the key attributes to a unique search index and storing the record at the search index. Deleting a record involves finding a record that matches the key and removing it from the search table. A virtual search table abstracts the functions that map the key to a search index. The mapping functions or search algorithms may be implemented in software, hardware, or both. Typical search algorithms include radix tree, AVL tree, hash table, Ternary Content Addressable Memory (TCAM), although other search algorithms may be used as well. In the embodiment shown in FIG. 3, the driver interacts with virtual index tables only. To enable virtual search tables to be presented to the applications, table manager 42 receives virtual search table API calls and translates the calls to a set of virtual index table instructions.

The virtual tables are implemented using physical memory allocations such that the virtual tables are stored using data structures in memory implemented as physical tables. In one embodiment, a physical table occupies a region of physical address space and contains one or more entries. An entry may span one or more contiguous physical memory locations. The physical table is specified by a base address, maximum number of entries, entry width, and entry stride (number of lines of memory occupied by each entry).

An entry is one or more contiguous physical memory locations in a physical offset table. Entries can be either contiguous or sparse with fixed stride. The width of an entry represents the number of bits that actually exist in a physical table. The entry stride is the number of bytes that is added to the current physical table offset to access the next physical entry. The width of an entry is always less than or equal to the entry stride *8, where 8 represents the number of bits per one byte.

The physical table is accessed using an offset from its base address. An offset, in this context, is a zero-based unsigned integer. Its value represents the number of bytes from the physical table base address to a specific entry. Each entry is associated with an offset relative to the physical table base address.

Driver 28 extracts information from the virtual tables 26 and installs information from the virtual tables into physical tables at the hardware layer (datapath hardware tables 18). Driver 28 thus maps information from the virtual tables 26 to the datapath hardware tables 18. As data is written to the data path hardware tables, driver 28 passes commands to a Kernel API to cause the kernel drivers to install the correct entries into the actual physical tables and registers implementing data path hardware tables 18 that are utilized by the hardware to make packet forwarding decisions.

According to an embodiment, driver 28 is implemented as a generic driver containing a mapping function 40. Mapping function uses data structures specified in a configuration library (Config LIB) 30 and a set of methods 32 which are used to access the data structures, to define a mapping between virtual tables 26 and datapath hardware tables 18. The methods 32 provide a set of access functions to the Config LIB data structures.

Virtual table schema definitions 34 are used to define the structure of the virtual tables 26 that are used by the applications to write information to the hardware. The virtual table schema definitions further include a definition of the datapath hardware tables 18. For example, the table definition schema may specify the location of the physical tables in memory accessible by the hardware elements, the attributes contained in each entry of the table, the width of each attribute, etc. The virtual table schema definition 34 is parsed, e.g. using perl code 36, to create the configuration library 30 and methods 32.

In one embodiment, the table definition schema file is implemented using an Excel spread sheet. The excel spread sheet in this embodiment includes a page defining operations (API calls) that may be implemented by applications on the virtual tables. This page of the spread sheet defines the API calls as well as values to be passed with the API calls and the function to be implemented by the API call.

A separate page may be implemented to define each of the virtual tables, e.g. to define the order of the fields and the width of the fields used by the virtual table to hold values. For example, a page defining a virtual index table may define the name of the index table (e.g. "next hop index table") the index width (e.g. 12 bits), and the number of entries (e.g. 4096). The attributes to be stored in the entries of the table may be defined such as by defining the attribute name, type, width, name of the virtual table where the attribute is to be stored, and the list of physical tables in the data plane where the attribute should be inserted.

The table definition schema file may also contain a definition of the data plane hardware tables 18, for example to specify the table name and record format to enable attributes specified in the virtual table to be inserted into the correct set of tables in the data plane.

The table definition schema file thus defines the structure of the virtual tables by defining the structure of the entries, attributes, and other content of the virtual tables. Further, the table definition schema file also specifies the location in the tables 18 where information from the virtual tables should be mapped by the driver.

Perl code 36 is used to parse the virtual table schema definitions 34 to create the configuration library 30 and associated methods 32. The Config.LIB specifies where the generic driver should map information from the virtual tables 26 to tables and registers implementing data path hardware tables 18 used by the hardware to implement packet forwarding decisions. The mapped entries from virtual tables are passed to a kernel driver to cause the data to be set in the tables 18. Methods 32 are used by the driver to access the data structure of configuration library 30.

By using a generic driver which does not need to be updated as modifications are made to the underlying hardware, modifications to the data plane may be accomplished simply by updating the virtual table schema definitions 34 to adjust the format of the fields used in the virtual tables, adjust the format of the physical tables implementing the datapath hardware tables 18, or to adjust the mapping between the virtual tables and the data path hardware tables 18. The updated virtual table schema definition is then parsed anew to create a new Config LIB data file and associated methods that may be used by the generic driver to access the config.LIB file, such that the modifications to the data plane may be implemented without requiring modifications to the generic driver.

The generic driver is configured to map attributes from the virtual tables to attributes in the physical tables. The configuration library includes a set of data structures and methods which are used by the generic driver to map information contained in the virtual tables to the physical tables. By causing the driver behavior to be based on the configuration library, any hardware changes may be simply implemented by updating the table definition schema. Parsing the table definition to create a new configuration library based on the table definition allows the generic driver to accommodate the changes in functionality without requiring the underlying driver code to be updated. Thus, the driver is self-adapting in that it can automatically adjust to the new hardware environment without requiring modifications to the generic driver code.

Figure 4:
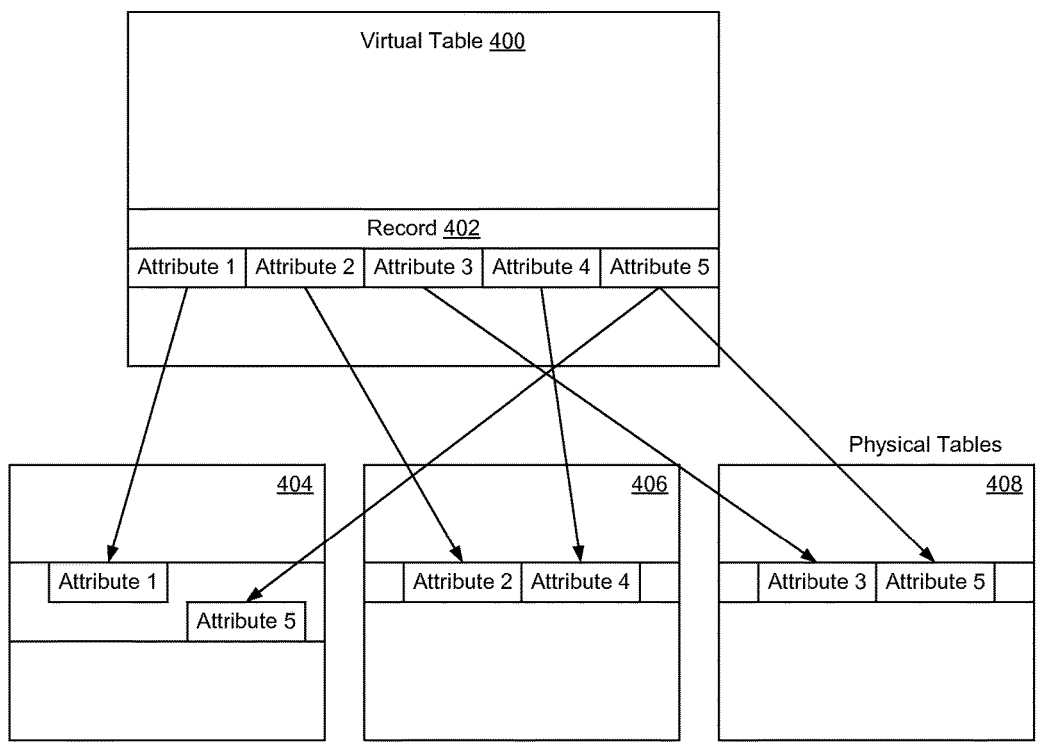
FIG. 4 is a diagram illustrating an example mapping between virtual and physical table elements.

FIG. 4 illustrates an example mapping between an example virtual table and a set of physical tables used by hardware elements to implement forwarding decisions for packets of data. As shown in FIG. 4, the virtual index table 400 includes records 402. Records 402 have one or more attributes which may be set by applications. The generic driver uses methods 32 to access the data structures contained in the config LIB 30 to determine where the attributes specified in the virtual tables should be inserted in the physical tables implementing the datapath hardware tables in the data plane.

The data plane may include multiple registers and physical tables (datapath hardware tables 18) which are used by the data plane to make forwarding decisions for packets of data. In the example shown in FIG. 4, there are three physical tables 404, 406, 408. Attributes 1 and 5 are mapped to physical table 404, attributes 2 and 4 are mapped to physical table 406, and attributes 3 and 5 are mapped to physical table 408. As shown in FIG. 4, a given attribute in a record of virtual table 400 may map to more than one register or physical table entry. Likewise, the order of attributes in the virtual table has no bearing on where the attributes may be mapped in the physical tables. This mapping is specified by config LIB 30.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing a self adapting driver for controlling datapath hardware elements of a network element, the method comprising the steps of:
providing a virtual table schema definition;
parsing the virtual table schema definition to specify a configuration library containing a set of data structures defining a mapping between a set of virtual tables and a set of physical tables used by the datapath hardware elements of the network element to make forwarding decisions for packets of data being transported on a communication network, and to specify a set of functions to be used to access the data structures;
using a generic driver to access the data structures via the set of functions to map data from records in the virtual tables to records in the physical tables.

2. The method of claim 1, wherein the virtual table schema definition defines a format of the virtual tables.

3. The method of claim 2, wherein the virtual table schema definition defines a format of the physical tables.

4. The method of claim 1, wherein the virtual table schema definition is implemented in a spread sheet application program.

5. The method of claim 1, wherein the generic driver contains a mapping function, the operation of which is wholly specified by the configuration library.

6. The method of claim 5, further comprising changing the virtual table schema definition to create a changed virtual table schema definition, and parsing the changed virtual table schema definition to define a new mapping between the set of virtual tables and the set of physical tables without changing the mapping function.

7. The method of claim 1, wherein the virtual table schema definition defines a virtual index table structure and defines a virtual search table structure, the virtual index table structure and virtual search table structure being accessible via an API to the virtual tables.

8. The method of claim 1, wherein records of the virtual tables contain a number of attributes, and wherein not every attribute of the virtual tables is mapped to the same physical table.

9. The method of claim 8, wherein subsets of the attributes of the virtual tables are mapped to different physical tables.

10. A network element, comprising:
an input interface, a forwarding interface, and an output interface, the forwarding interface interacting with physical tables to define forwarding operations on packets between the input interface and output interface;
at least one application configured to control operation of the network element through insertion of data into the physical tables, the physical tables being used by the forwarding interface to make forwarding decisions for packets of data being transported on a communication network;
a virtual table interface layer presenting to the application via an API a set of virtual tables in which the application can store the data to be inserted into the physical tables; and
a self-configuring driver intermediate the virtual table interface layer and the physical tables, the self-configuring driver being implemented as a mapping function the functionality of which is fully specified by a configuration library created by parsing a virtual table schema definition of the virtual tables.

11. The network element of claim 10, wherein the virtual table schema definition defines a format of the virtual tables.

12. The network element of claim 11, wherein the virtual table schema definition defines a format of the physical tables.

13. The network element of claim 10, wherein the virtual table schema definition is implemented in a spread sheet application program.

14. The network element of claim 10, wherein the virtual table schema definition defines a virtual index table structure and defines a virtual search table structure.

15. The network element of claim 10, wherein records of the virtual tables contain a number of attributes, and wherein not every attribute of the virtual tables is mapped to the same physical table.

16. The network element of claim 15, wherein subsets of the attributes of the virtual tables are mapped to different physical tables.

* * * * *